US009820440B2

(12) United States Patent
Jost et al.

(10) Patent No.: US 9,820,440 B2
(45) Date of Patent: Nov. 21, 2017

(54) DUAL CAM CONTROLLED REEL TINES

(71) Applicant: AGCO Corporation, Hesston, KS (US)

(72) Inventors: Dustin Jost, Hillsboro, KS (US);
Daniel Dreyer, Buhler, KS (US)

(73) Assignee: AGCO Corporation, Duluth, GA (US)

( * ) Notice: Subject to any disclaimer, the term of this patent is extended or adjusted under 35 U.S.C. 154(b) by 126 days.

(21) Appl. No.: 14/652,534

(22) PCT Filed: Dec. 18, 2013

(86) PCT No.: PCT/US2013/075982
§ 371 (c)(1),
(2) Date: Jun. 16, 2015

(87) PCT Pub. No.: WO2014/100105
PCT Pub. Date: Jun. 26, 2014

(65) Prior Publication Data
US 2015/0313081 A1 Nov. 5, 2015

Related U.S. Application Data

(60) Provisional application No. 61/740,519, filed on Dec. 21, 2012.

(51) Int. Cl.
*A01D 57/02* (2006.01)
*A01D 57/04* (2006.01)
*A01D 34/04* (2006.01)
*A01D 57/03* (2006.01)

(52) U.S. Cl.
CPC ............. *A01D 57/04* (2013.01); *A01D 34/04* (2013.01); *A01D 57/03* (2013.01)

(58) Field of Classification Search
CPC .......... A01D 57/03; A01D 57/04; A01D 34/04
USPC ................. 56/14.4, 220–222, 226, 364, 17.3
See application file for complete search history.

(56) References Cited

U.S. PATENT DOCUMENTS

| | | | | |
|---|---|---|---|---|
| 2,144,905 | A | * | 1/1939 | Wallace ................. A01D 57/04 56/226 |
| 2,862,347 | A | | 12/1958 | Na |
| 4,597,252 | A | * | 7/1986 | Williames .............. A01D 47/00 56/13.1 |

(Continued)

OTHER PUBLICATIONS

U.S. International Searching Authorty, International Search Report for International Patent Application No. PCT/US2013/075982, dated Apr. 23, 2014.

*Primary Examiner* — Thomas B Will
*Assistant Examiner* — Mai Nguyen

(57) ABSTRACT

A dual-cam linkage system controls the orientation of tines on a reel of a crop harvesting header. The dual-cam linkage system includes a stationary, substantially circular first cam track that has a rotational center that is offset from the rotational axis of the reel. A second cam track is located in a support plate on which a tine-supporting member is mounted. The dual-cam linkage system also includes a pivoting linkage having a crank, an arm. The crank has a first end fixedly attached to the tine-supporting member. The arm has an outer end attached to a second end of the crank. The first cam follower is attached at an inner end of the arm and engages the first cam track. The second cam follower is attached to the arm at a position between the first cam follower and the crank and engages the second cam track.

10 Claims, 4 Drawing Sheets

(56) References Cited

U.S. PATENT DOCUMENTS

| | | | |
|---|---|---|---|
| 5,987,861 A * | 11/1999 | Duncan | A01D 57/03 460/142 |
| 6,530,202 B1 * | 3/2003 | Guyer | A01D 57/03 56/220 |
| 6,591,598 B2 | 7/2003 | Remillard et al. | |
| 7,665,287 B2 * | 2/2010 | Jones | A01D 57/02 56/226 |
| 8,261,524 B1 | 9/2012 | McClure et al. | |
| 9,392,747 B2 * | 7/2016 | Patterson | A01D 61/008 |
| 2003/0061794 A1 * | 4/2003 | Remillard | A01D 57/03 56/14.4 |
| 2003/0126846 A1 | 7/2003 | Guyer | |
| 2008/0022647 A1 | 1/2008 | Jones | |
| 2011/0185695 A1 | 8/2011 | Guyer | |

\* cited by examiner

DUAL CAM CONTROLLED REEL TINES

CROSS REFERENCE TO RELATED APPLICATION

This application is a national phase application of international patent application number PCT/US2013/075982, filed Dec. 18, 2013, which claims priority to U.S. provisional application Ser. No. 61/740,519, filed Dec. 21, 2012. The full disclosures, in their entireties, of international patent application number PCT/US2013/075982 and U.S. provisional application No. 61/740,519 are hereby incorporated by reference.

BACKGROUND OF THE INVENTION

Field of Invention

This invention relates generally to a reel on a crop harvesting header, and more particularly to a mechanism that varies the angle of tines on the reel as the reel rotates.

Description of Related Art

Crop harvesting headers include a cutter bar and a reel utilizing a plurality of tines of fingers for controlling movement of the crop in the area over the cutter bar. A crop harvesting header can be used in a variety of different crops with varying conditions such as green, tough, lying down, wet, or tangled. Desirably, the reel needs to be able to function in all these crop situations to feed the crop uniformly into the harvester.

Typically, the reel is rotatable about an axis generally parallel to the cutter bar and has a plurality of reel tubes spaced around the axis of a center tube. Each reel tube has several tines projecting generally radially outward from the reel axis that interact with the crop through different zones around the reel. The tines first need to pick up any crop that is laying down and push any crop that is standing across the cutter bar. Then, once the crop has been cut and is being carried onto the platform, the tines need to release the crop so that it doesn't carry the crop out of the header. Finally, the reel tines need to flip over as they go around the top of the reel so that crop does not wrap on the reel tubes. Each reel tube typically pivots about its axis parallel to the reel axis so as to vary the angle of the tines about the tube axis as the reel rotates.

It would be desirable to improve the pivotal movement of the tube and thus the tine path through the different tine path zones.

OVERVIEW OF THE INVENTION

In one embodiment, the invention is directed to a crop harvesting header having a header frame structure arranged for movement in a direction of working movement across ground carrying a crop to be harvested such that a cutter bar arranged across a forward edge of the header frame structure can cut the crop, and a reel for controlling movement of the crop in the area over the cutter bar. The reel is mounted on the header frame structure for movement therewith in the direction of movement and for rotation about a center reel axis. The reel has a plurality of tine-supporting members at spaced positions around the reel axis so that rotation of the reel causes the tine-supporting members to follow a path of movement around the center reel axis. Each tine-supporting member has a plurality of crop-engaging tines, wherein each of the tine-supporting members is pivotable about its respective axis, which axis is parallel to the reel axis, so as to vary the angle of the tines as the reel rotates. A dual-cam linkage system controls an angular orientation of each of the plurality of tine-supporting members and the tines mounted thereon.

The dual-cam linkage for each of the plurality of tine-supporting members includes a stationary, substantially circular first cam track that has a rotational center that is offset from the rotational axis of the reel, wherein said first cam track is used to change the angular orientation of all of the tine-supporting members. A second cam track is located in the support plate on which the tine-supporting member is mounted, wherein each tine-supporting member has a dedicated second cam track. The dual-cam linkage system also includes a pivoting linkage having a crank, an arm. The crank has a first end fixedly attached to the tine-supporting member. The arm has an outer end attached to a second end of the crank. The first cam follower is attached at an inner end of the arm and engages the first cam track. The second cam follower is attached to the arm at a position between the first cam follower and the crank and engages the second cam track. Rotational movement of the reel causes the dual-cam linkage system to change an angular orientation of each of the plurality of tine-supporting members and the tines mounted thereon.

These and other features and advantages of this invention are described in, or are apparent from, the following detailed description of various example embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
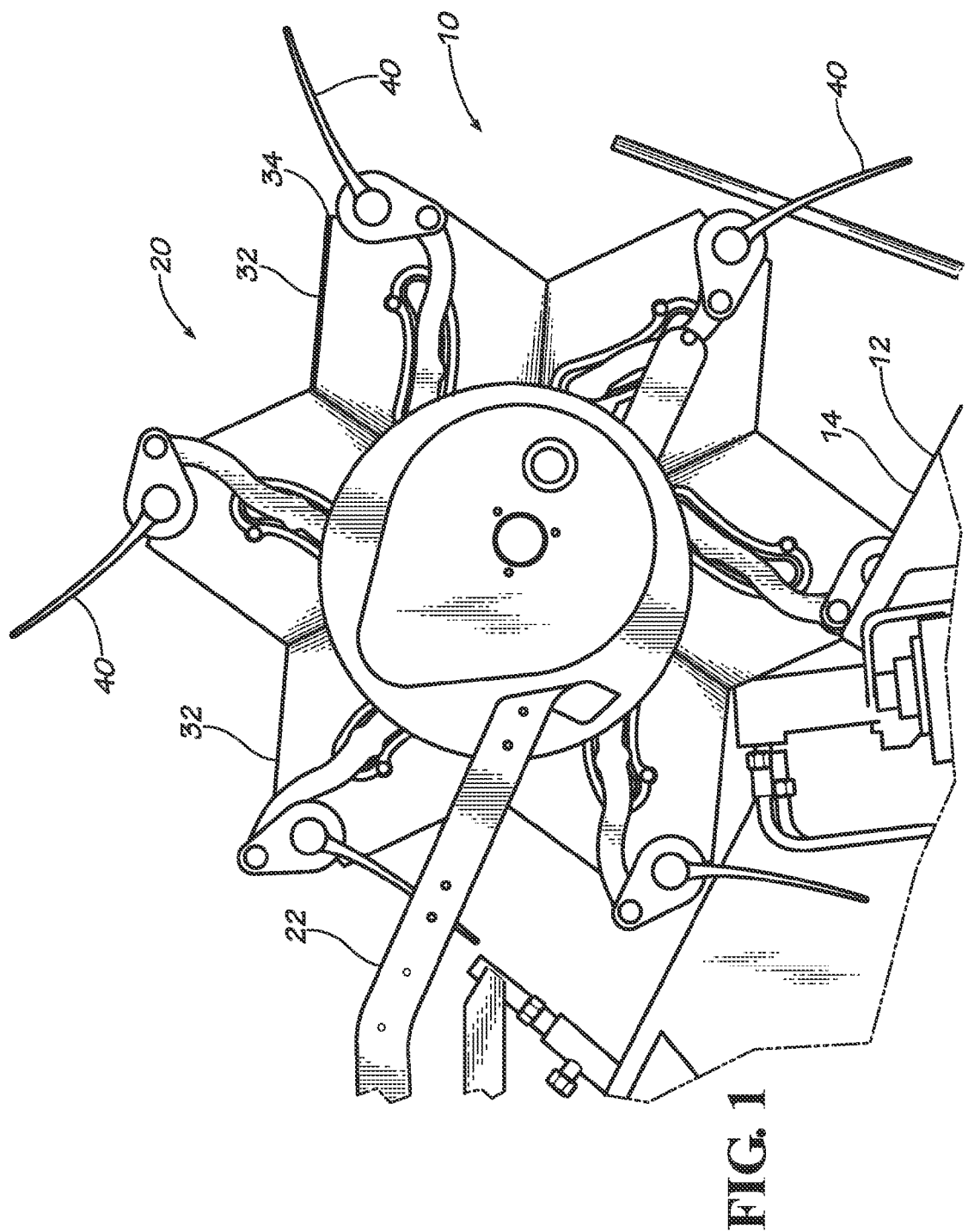
FIG. 1 is an end elevation of a header according to the present invention looking along the header toward one end and showing the reel, reel support arms, tine-supporting members.

In FIG. 1 is shown an embodiment of a header according to the present invention with a number of the elements being shown schematically since the general construction of such headers is well known to one skilled in the art. The header 10 includes a header frame 12 extending between two end frames one of which is shown at 14 and the other of which at the other end and therefore not visible in the elevation of FIG. 1. The header frame 12 is suitably supported and attached on a propulsion vehicle in a manner so that the header 10 can be moved forwardly across the ground in cutting a standing crop. The header 10 carries a plurality of structural elements such as for a draper or auger conveyor arranged to transport the crop after cutting to a discharge location in the center of the header 10 that are not shown for convenience of illustration as they are well known to one skilled in the art and can vary in accordance with engineering considerations. Additionally, as is well known in the art, a cutter bar provides a cutting action on the standing crop so that the crop is deposited on the conveyor for transportation to the discharge location. When used on a combine harvester, the discharge location of the header 10 is associated with a crop transfer system which transfers the crop rearwardly into a feeder house of the combine. Headers 10 of this type can of course also be used as a swather where the discharge location simply discharges the crop onto the ground in a swath or through a crop conditioner onto the ground.

The header 10 further includes a reel generally indicated at 20. The reel 20 includes pivotable mounting arms 22 that project forwardly from the frame 12 to a position over the end frame elements 14 so as to provide support for the reel 20. As is known in the art, each arm 22 is movable in its pivotal action by a suitable drive actuator. The number of arms 22 can vary in accordance with engineering requirements depending upon the width of the header 20. Some headers 20 have only arms 22 at the ends and some have additional arms intermediate the ends to provide the necessary support.

Figure 2:
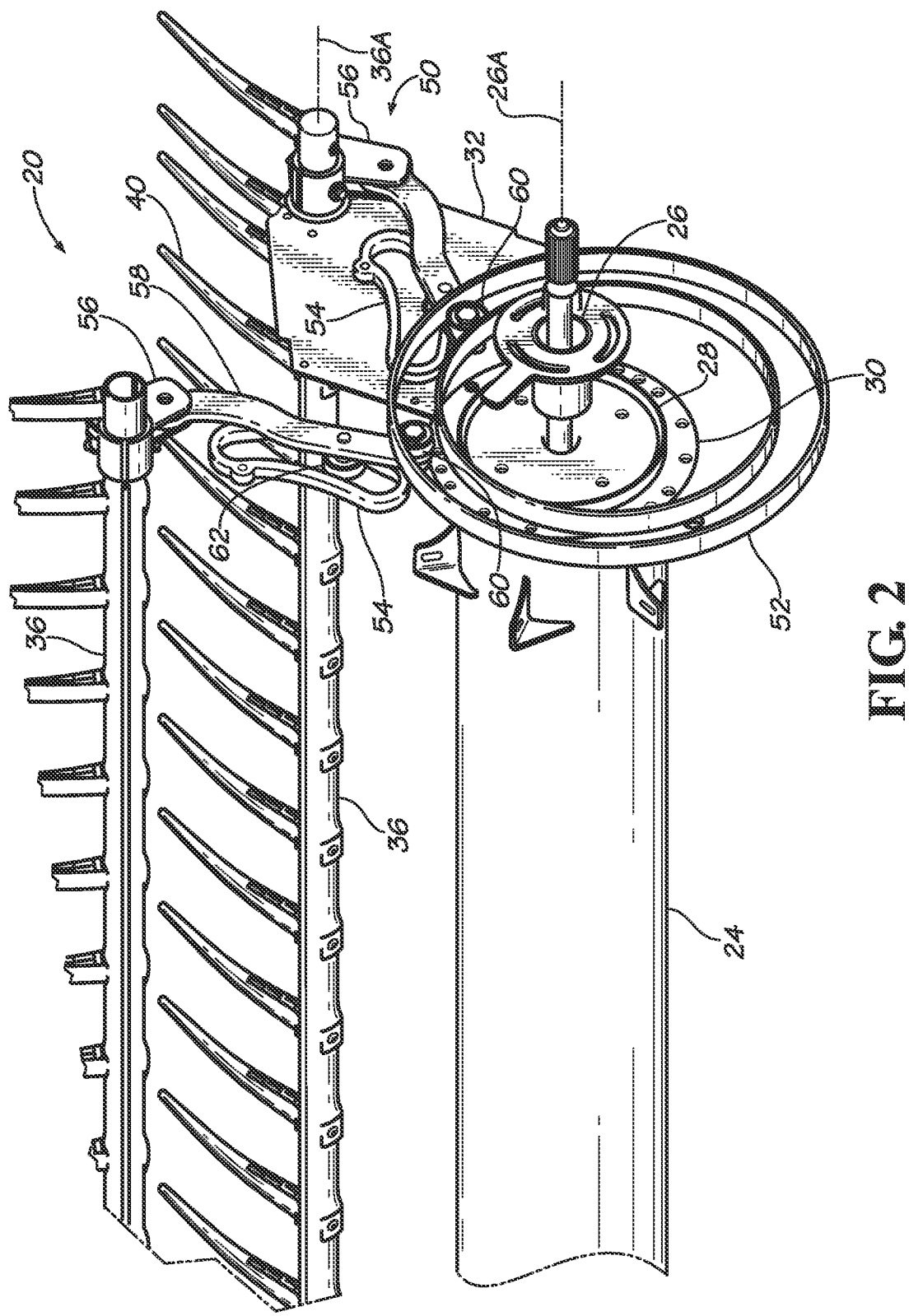
FIG. 2 is a perspective view of the reel of FIG. 1 showing only the components of the reel and reel support arms, with only two of the tine-supporting members and associated components shown for convenience of illustration.
Figure 3:
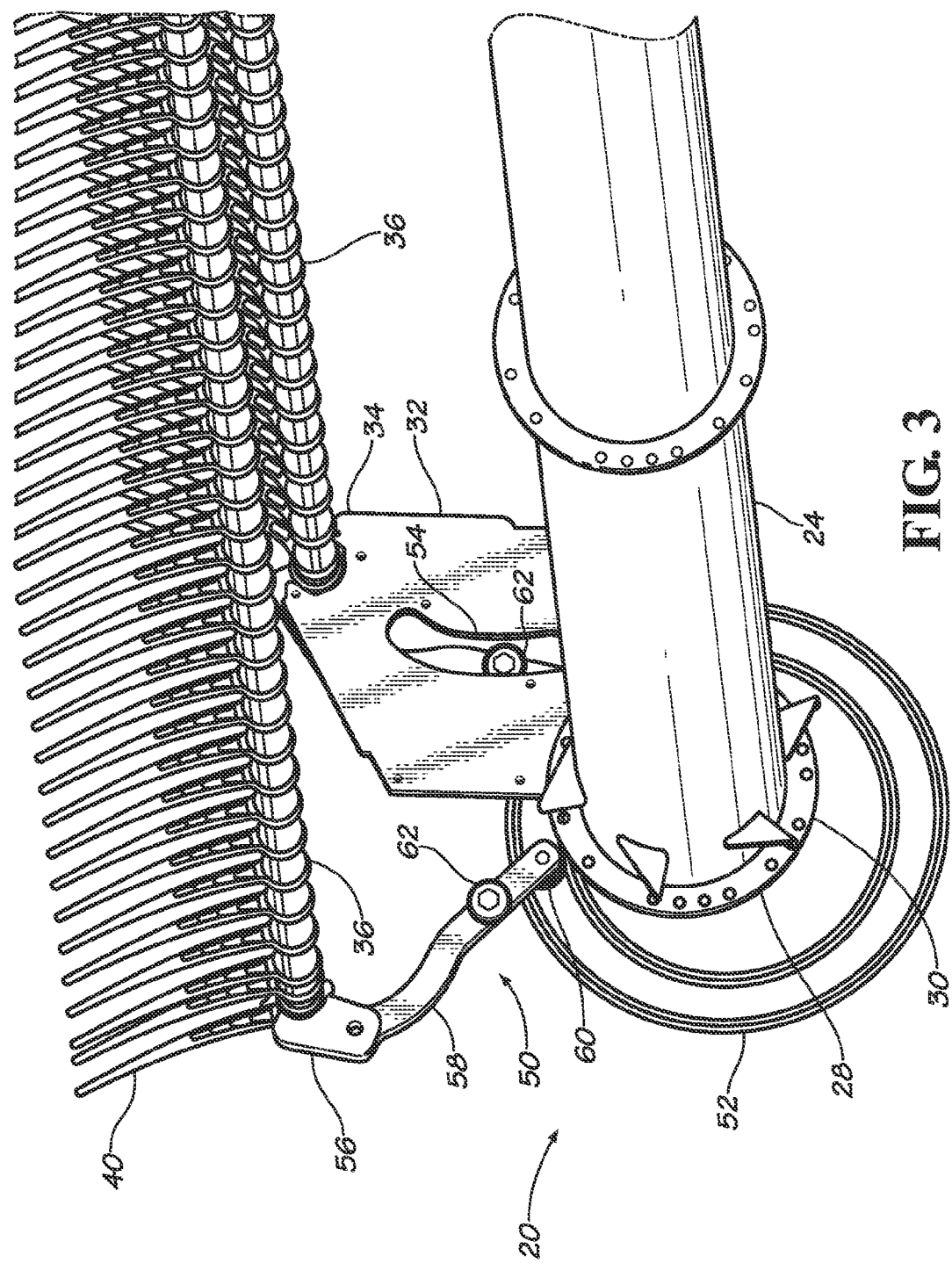
FIG. 3 is a perspective view of the reel of FIG. 2 looking from the opposite direction.

Turning now to FIGS. 2 and 3, the reel 20 comprises a center tube 24, broadly a center support structure, extending along the length of the reel 20 and providing structural support therefore. As best seen in FIG. 2, a shaft 26 is suitably attached within the center tube 24 as a stub shaft portion which projects from an end of the center tube 24 for mounting of the center tube 24 on the arm 22 and supporting the center tube 24 for rotation about an axis 26A of the reel 20 as known in the art. The reel 20 further includes end support discs 28, broadly end structures, mounted on the shaft 26 at ends of the center tube 24. It will be appreciated that the structural arrangement of the discs 28 can vary in accordance with engineering requirements without departing from the scope of the invention.

Figure 4:
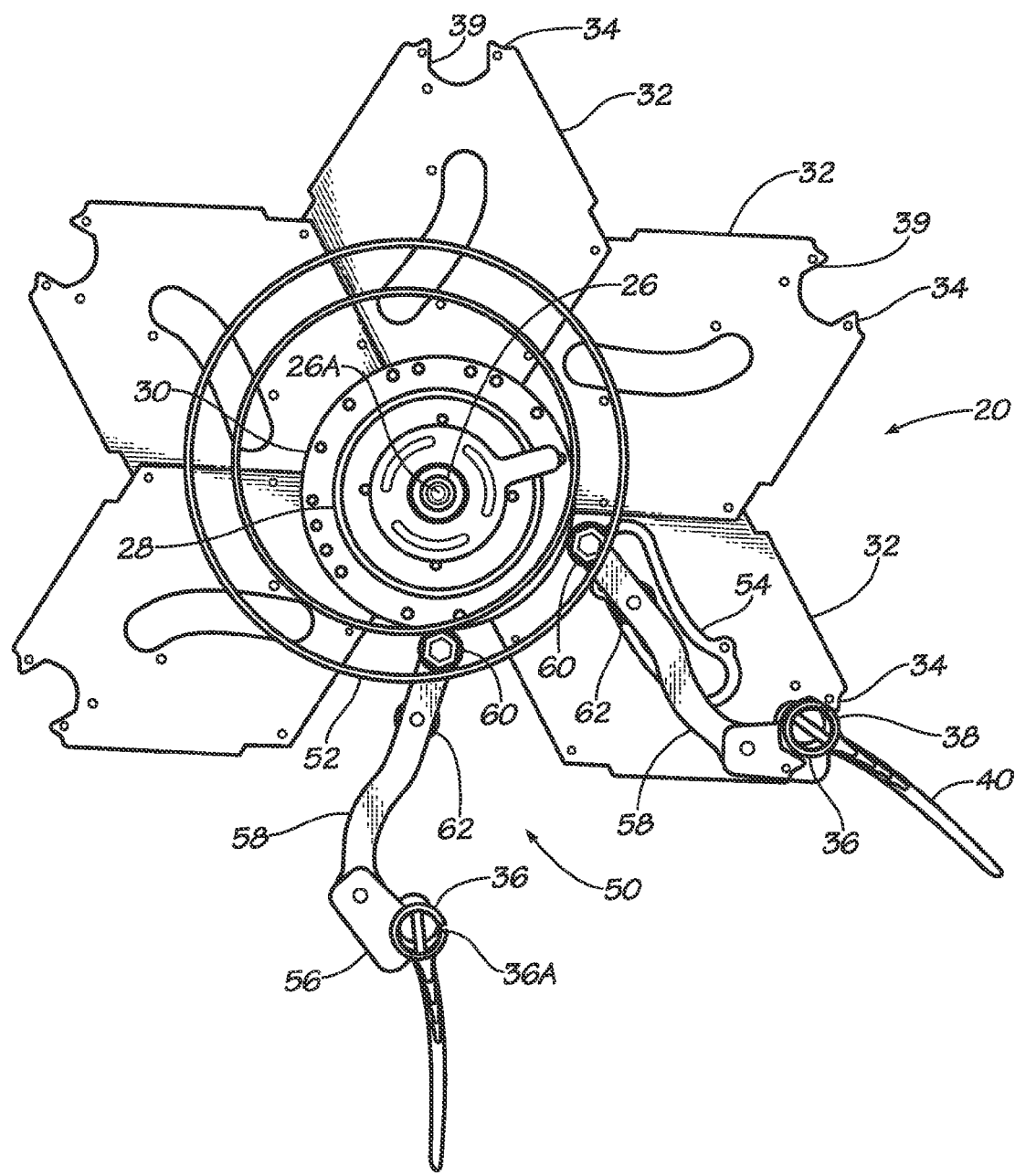
FIG. 4 is an end elevation of the reel of FIG. 1 looking from the opposite direction and showing only the components of the reel and reel support arms, with only one of the tine-supporting members and associated components shown for convenience of illustration.

Turning also now to FIG. 4, in the illustrated embodiment each support disc 28 comprises a peripheral ring 30. The ring 30 carries a plurality of support plates 32 at spaced positions around the axis 26A of the reel 20. Each support plate 32 extends generally outwardly to a distal end 34 outboard of the peripheral ring 30 where the plates 32 support a plurality of tine tubes 36, broadly tine-supporting members, at angularly spaced positions around the axis 26A of the reel 20. Each tine tube 36 is mounted with a bearing assembly 38 in an end cup 39 at the distal end 34 of the plate 32. While the illustrated embodiment has a plurality of plates 32 positioned around the peripheral ring 30 of the support disc 28, one skilled in the art will understand that the plate 32 may be configured to support more than one or even all of the tine tubes 36. In the embodiment shown, the tine tubes 36 are cylindrical tubes on which is attached a plurality of longitudinally spaced tines 40 which project outwardly from the tube 36 for engaging the crop. Tines 40 may be of conventional design and may be attached to the tine tubes 36 using any means known in the art so further discussion of the tines 40 need not be contained herein.

Each tine tube 36 pivots about its own individual axis 36A so as to change the angular orientation or position of the tines 40 as the tine tubes 36 rotate through different zones around the reel 20 as best seen in FIG. 1. According to the invention, the angular position of the tine tube 36 about its axis 36A relative the reel axis 26A is controlled by a dual-cam linkage system 50 so that as the reel 20 rotates each tine tube 36 through the different zones about the reel 20 while moving through the field, the dual-cam linkage system 50 pivots the tine tube 36 to move the tines 40 to a desired angular orientation.

The dual-cam linkage system 50 has a first cam track 52 used to control movement of each of the tine tubes 36. Desirably, the first cam track 52 is substantially circular and has a rotational center that is offset from the axis 26A of the center tube 26 as best seen in FIG. 4. In the illustrated embodiment, the first cam track 52 is fixedly attached to the arm 22 of the header 20 on the outside of the plates 32 so that it does not rotate with the reel 20.

The dual-cam linkage system 50 has a plurality of second cam tracks 54, with each tine tube 36 having its dedicated second cam track 54 located on its respective plate 32. Desirably, the second cam track 54 has a non-linear shape as will be described below in more detail.

Each tine tube 36 has a dedicated tube-pivoting linkage 55 interfacing with the first and second cam tracks 52, 54. In the illustrated embodiment, the tube-pivoting linkage 55 includes a crank 56 fixedly attached to the tube with an arm 58 attached to the crank 56. As can be seen from FIG. 1, the tine tube 36 is attached at a first end of the crank 56 and the arm 58 is attached at an opposite end. Since the tine tube 36 and thus the first end of the crank 56 is pivotably attached in the end cup 39 of the plate 32, movement of the arm 58 attached at the second end of the crank 56 is turned into pivoting movement of the crank 56 and thus the tine tube 36 about its axis 36A.

The arm 58 has a first cam follower 60 attached thereto at a first end opposite the end attached to the crank 56 and a second cam follower 62 attached thereto at a position between the first cam follower 60 and the crank 56. The first cam follower 60 is positioned in the stationary first cam track 52 and moves in a circular motion around the first cam track 52 as the reel 20 rotates. As the center of the first cam track 52 is offset from axis 26A of the center tube 26, rotational movement of the first cam follower 60 around the first cam track 52 changes the distance of the arm 58 from the center axis 26A. This change in radial distance from the axis 26A provides a pushing or pulling action on the crank 56 so as to pivot the tine tube 36 around its axis 36A. The non-linear shape of the second cam track 54 manipulates the action of the arm 58 and the attached crank 56 as the first cam follower 60 goes around the first cam track 52 to control the angular position of the tine tube 36 and thus the tines 40. The shape and arrangement of the second cam track 54 is calculated so as to provide a desired tine action based on the position of the second cam track 54 in the plate 32 and size and shape of the crank 56. In the example embodiment, the second cam track has an "S" shape. Movement of the second cam follower 62 in the "S" shaped second cam track 54 forces the first cam follower 60 towards the center of the reel 20.

Thus, the dual-cam linkage system 50 controls the orientation or position of the tine tube 36 relative to the respective tube axis 36A to cause pivotal movement of the respective tube 36 about the tube axis 36A and thus, for each of the positions, to move the tines 40 of the tube 36 around the tube axis 36A to a desired orientation relative to a plane passing through the center reel axis 26A and the tine tube axis 36A. The dual-cam linkage system 50 allows for the tines 40 to stay extended while the tines enter the crop, carry the crop across the cutter bar, and then release the crop onto the platform of the header 10. The dual-cam linkage system 50 also allows for the tines 40 to flip over when they are not in the uncut crop to help prevent the crop from wrapping around the tine tubes 36. In one embodiment, the orientation of the tine angle in the different reel zones can be adjusted to account for different crop conditions by manipulating the fixed position of the first cam track 52 on the arm 22 so that the angular position of the tines 40 as determined by the dual-cam linkage system 50 is changed.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. A crop-harvesting header for use with an agricultural harvesting machine, the header having a reel positioned in the forward part thereof for manipulating a crop to be harvested, the reel comprising:
    a center structural member extending along the length of the reel, the center structural member being rotatable about an axis of the reel;
    an end support structure on at least one end of the center structural member;
    a plurality of support plates attached to the center structural member at spaced positions around the axis of the reel, each plate having a distal end extending outwardly of the end support structure;
    a plurality of tine-supporting members at angularly spaced positions around the axis of the reel, each tine supporting member being rotatably mounted at the distal end of one of the plurality of support plates so as to rotate about a tine axis, wherein the tine-supporting members have a plurality of tines that project outwardly for engaging the crop; and
    a dual-cam linkage system configured to change an angular orientation of each of the plurality of tine-supporting members and the tines mounted thereon, wherein the dual-cam linkage system for each of the plurality of tine-supporting members comprises:
        a first cam track continuous around the rotational axis of the reel that has a rotational center that is offset from the rotational axis of the reel such that a distance between the first cam track and the rotational axis varies according to a position on the first cam track around the rotational axis, wherein said first cam track is used to change the angular orientation of all of the plurality of tine-supporting members as the tine-supporting members travel around the rotational axis of the reel;
        a second cam track located in the support plate on which the tine-supporting member is mounted, wherein each tine-supporting member has a dedicated second cam track with the second cam track having a fixed spatial relationship with the tine axis of the tine-supporting member mounted to the support plate;
        a pivoting linkage, wherein each tine-supporting member has a dedicated pivoting linkage, the pivoting linkage comprising:
            a crank, the crank having a first end attached to the tine-supporting member;
            an arm, the arm having an outer end attached to a second end of the crank;
            a first cam follower attached at an inner end of the arm, the first cam follower continuously engaging the first cam track; and
            a second cam follower attached to the arm at a position between the first cam follower and the crank, the second cam follower engaging the second cam track such that the fixed spatial relationship of the second cam track with the tine axis of the respective tine-supporting member guides movement of the arm as a distance of the first cam follower from the rotational axis of the reel is changed by the first cam;
        wherein rotational movement of the reel causes the dual-cam linkage system to change an angular orientation of each of the plurality of tine-supporting members and the tines mounted thereon.

2. The header of claim 1 wherein the first cam track is substantially circular and does not rotate with the reel.

3. The header of claim 2 wherein the first cam follower moves in a circular motion around the first cam track as the reel rotates with rotational movement of the first cam follower around the first cam track changing the distance of the arm from the center axis of the reel.

4. The header of claim 3 wherein the change in radial distance of the arm from the reel axis provides a pushing or pulling action on the crank so as to pivot the tine-supporting member about its axis.

5. The header of claim 1 wherein the crank is pivotally mounted on the arm.

6. The header of claim 1 wherein the crank is fixedly attached to the tine-supporting member.

7. The header of claim 1 wherein the second cam track has a non-linear shape.

8. The header of claim 7 wherein the non-linear shape of the second cam track manipulates the action of the arm and the attached crank as the first cam follower goes around the first cam track.

9. The header of claim 8 wherein the second cam track has an "S" shape.

10. The header of claim 7 wherein movement of the second cam follower in the second cam track forces the first cam follower towards the center of the reel.

* * * * *